US010171507B2

(12) United States Patent
Jain et al.

(10) Patent No.: US 10,171,507 B2
(45) Date of Patent: Jan. 1, 2019

(54) MICROSEGMENTATION IN HETEROGENEOUS SOFTWARE DEFINED NETWORKING ENVIRONMENTS

(71) Applicant: Cisco Technology, Inc., San Jose, CA (US)

(72) Inventors: Praveen Jain, Cupertino, CA (US); Munish Mehta, Fremont, CA (US); Saurabh Jain, San Jose, CA (US); Yibin Yang, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 211 days.

(21) Appl. No.: 15/159,379

(22) Filed: May 19, 2016

(65) Prior Publication Data

US 2017/0339188 A1 Nov. 23, 2017

(51) Int. Cl.
*G06F 21/00* (2013.01)
*H04L 29/06* (2006.01)
*H04L 12/931* (2013.01)
*G06F 9/455* (2018.01)
*H04L 12/713* (2013.01)

(52) U.S. Cl.
CPC .............. *H04L 63/20* (2013.01); *G06F 9/455* (2013.01); *H04L 45/586* (2013.01); *H04L 49/70* (2013.01); *H04L 63/0428* (2013.01)

(58) Field of Classification Search
None
See application file for complete search history.

(56) References Cited

U.S. PATENT DOCUMENTS 8,127,347 B2 * 2/2012 Xiao ...................... H04L 63/104
 709/229
8,713,669 B2 * 4/2014 Guichard ............ H04L 63/0272
 380/277

(Continued)

OTHER PUBLICATIONS

International Search Report and Written Opinion by the International Searching Authority, dated Jul. 27, 2017, for the corresponding International Application No. PCT/US2017/033297, 13 pages.

*Primary Examiner* — Maung T Lwin
(74) *Attorney, Agent, or Firm* — Polsinelli PC

(57) ABSTRACT

Microsegmentation in a heterogeneous software-defined network can be performed by classifying endpoints associated with a first virtualized environment into respective endpoint groups based on respective attributes, and classifying endpoints associated with a second virtualized environment into respective security groups based on respective attributes. Each respective endpoint group can correspond to a respective security group having the same attribute. Each respective endpoint group and corresponding security group can be associated with a respective policy model defining rules for processing associated traffic. Each of the respective security groups can be used to generate a respective network attribute endpoint group, which can include the network addresses of those endpoints in the respective security group. Each respective network attribute endpoint group can inherit the policy model of the respective endpoint group corresponding to the respective security group. Traffic between the endpoints can then be processed based on the various classifications and associated rules.

20 Claims, 6 Drawing Sheets

(56) References Cited

U.S. PATENT DOCUMENTS

| | | | |
|---|---|---|---|
| 8,730,980 B2* | 5/2014 | Bagepalli | H04L 49/356 370/395.53 |
| 2010/0071024 A1* | 3/2010 | Eyada | H04L 63/0263 726/1 |
| 2010/0281533 A1* | 11/2010 | Mao | H04L 63/02 726/13 |
| 2011/0067107 A1* | 3/2011 | Weeks | G06F 21/55 726/23 |
| 2011/0113467 A1* | 5/2011 | Agarwal | G06F 21/6281 726/1 |
| 2011/0299413 A1* | 12/2011 | Chatwani | H04L 12/4625 370/252 |
| 2013/0019277 A1 | 1/2013 | Chang et al. | |
| 2013/0163606 A1 | 6/2013 | Bagepalli et al. | |
| 2013/0312056 A1* | 11/2013 | Chang | H04L 63/0218 726/1 |
| 2014/0040975 A1* | 2/2014 | Raleigh | H04W 12/12 726/1 |
| 2015/0139238 A1 | 5/2015 | Pourzandi et al. | |
| 2016/0057121 A1* | 2/2016 | Metsala | H04L 63/0823 713/175 |

* cited by examiner

200

| | | 138 | |
|---|---|---|---|
| 202 — | attr-epg-app | [ vm7-app | ] |

| | | 136 | 140 | 144 | |
|---|---|---|---|---|---|
| 204 — | attr-epg-web | [ vm6-web; | vm8-web, | vm9-web | ] |

| | | 130 | |
|---|---|---|---|
| 206 — | sg-app1 | [ vm3-app | ] |

| | | 224 | |
|---|---|---|---|
| 208 — | sg-db1 | [ | ] |

| | | 126 | 128 | |
|---|---|---|---|---|
| 210 — | sg-web1 | [ vm1-web; | vm2-web | ] |

| | | 224 | |
|---|---|---|---|
| 212 — | sg-app2 | [ | ] |

| | | 134 | |
|---|---|---|---|
| 214 — | sg-db2 | [ vm5-db | ] |

| | | 132 | |
|---|---|---|---|
| 216 — | sg-web2 | [ vm4-web | ] |

| | | 130 | |
|---|---|---|---|
| 218 — | mac-epg-app | [ vm3-app | ] |

| | | 134 | |
|---|---|---|---|
| 220 — | mac-epg-db | [ vm5-db | ] |

| | | 126 | 128 | |
|---|---|---|---|---|
| 222 — | mac-epg-web | [ vm1-web; | vm2-web; | |
| | | vm4-web; | web; | vm1-web ] |
| | | 132 | 142 | 144 |

*FIG. 2*

MICROSEGMENTATION IN HETEROGENEOUS SOFTWARE DEFINED NETWORKING ENVIRONMENTS

TECHNICAL FIELD

The present technology pertains to implementing software-defined networks, and more specifically to microsegmentation in datacenters deploying heterogeneous software-defined solutions and hosts.

BACKGROUND

Microsegmentation can greatly increase security in a data center network by dividing the data center into smaller, protected zones, and isolating traffic associated with the various, protected zones. For example, administrators can firewall traffic traveling from one segment of the data center to another (east-west traffic). This consequently limits an attackers' ability to move laterally in the data center. Moreover, security services can be provisioned not only at the perimeter of a network segment but also between application tiers and even between devices within tiers. With such fine granularity of control, microsegmentation can allow a network breach to be contained into a small fault domain to protect the integrity of the rest of the data center.

A modern data center may deploy different software defined networking (SDN) solutions, such as CISCO APPLICATION CENTRIC INFRASTRUCTURE (ACI) and VMWARE NSX. The data center may also deploy different kinds of hosts or hypervisors, such as VMWARE ESX/ESXI, WINDOWS HYPER-V, and bare metal physical hosts. Unfortunately, many of the different hypervisors, servers, and SDN platforms do not adequately interoperate. As a result, microsegmentation in heterogeneous data centers is greatly limited.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 2 illustrates an example list of attribute endpoint groups and security groups for microsegmentation;

DESCRIPTION OF EXAMPLE EMBODIMENTS

Figure 1:
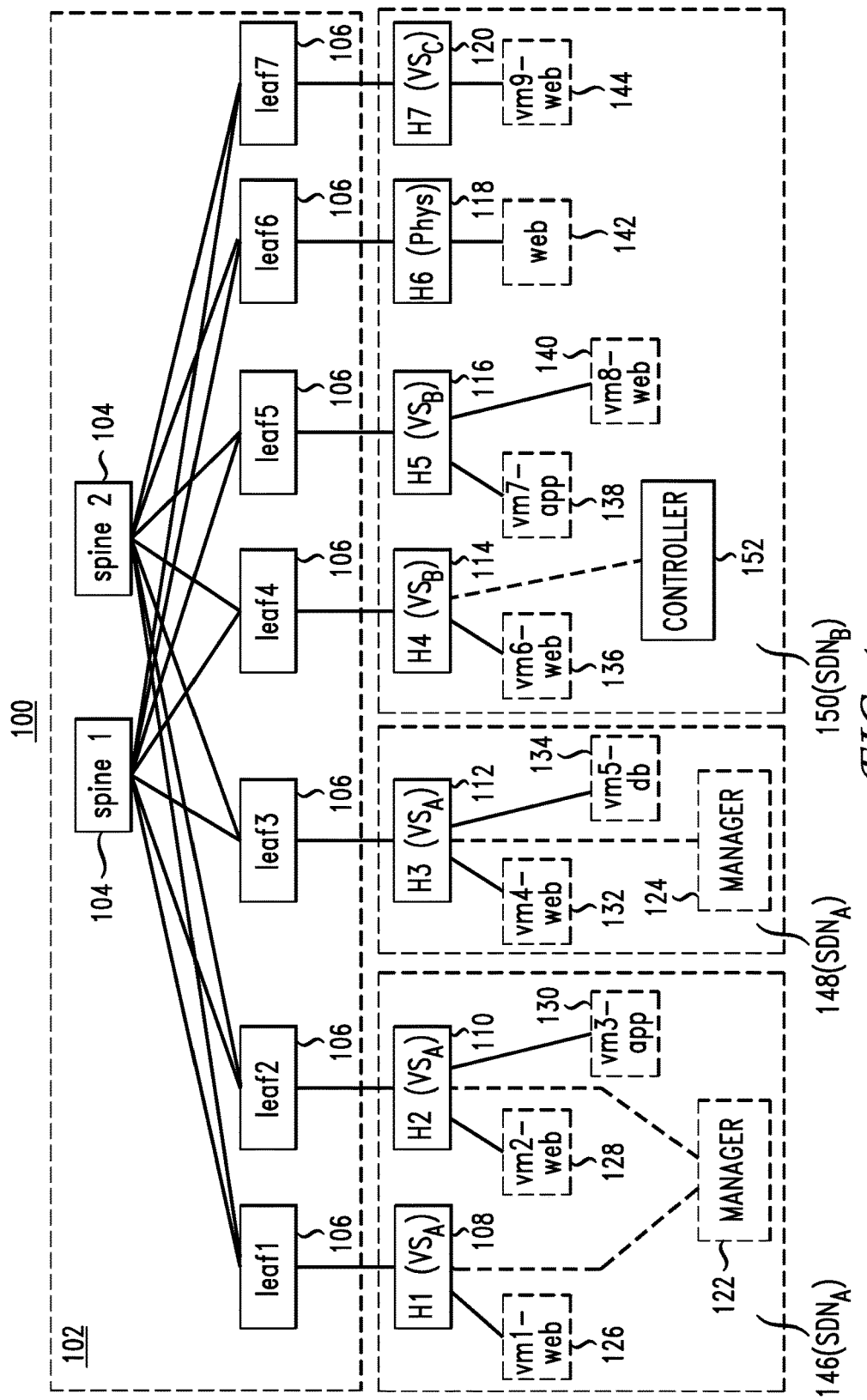
FIG. 1 illustrates a diagram of an example heterogeneous datacenter.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The approaches set forth herein can be used to perform microsegmentation in a heterogeneous network environment. Current networks and data centers often include different types of software defined network (SDN) solutions (e.g., CISCO ACI, VMWARE NSX, etc.), hosts (e.g., VMWARE ESXI, WINDOWS HYPER-V, bare metal hosts, etc.), and virtual switching elements (e.g., CISCO APPLICATION VIRTUAL SWITCH, VSPHERE DISTRIBUTED SWITCH, etc.). Unfortunately, microsegmentation is not supported between different SDNs, hosts, or virtual switching elements. Accordingly, microsegmentation in heterogeneous networks is greatly limited. Advantageously, the approaches set forth herein enable microsegmentation across different types of SDNs, hosts, virtual switching elements, and/or any other virtualized environment or element.

Disclosed are systems, methods, and computer-readable storage media for microsegmentation in a heterogeneous network. An example method can include classifying each of a first set of endpoints in a network into a respective endpoint group based on a respective attribute associated with the respective endpoint group. The first set of endpoints can be associated with a first type of virtualized environment. The virtualized environment can include a SDN environment, a type of virtual host (e.g., a type of hypervisor), a type of virtual switching element or device (e.g., CISCO APPLICATION VIRTUAL SWITCH), etc.

The method can further include defining, for the respective endpoint group, a first respective policy model including one or more rules for processing associated network traffic. The policy model can include contracts, rules, or policies for traffic associated with the respective endpoint group.

The method can include identifying a second set of endpoints associated with a second type of virtualized environment that is different than the first type of virtualized environment, and assigning each of the second set of endpoints to a respective security group, where the respective security group corresponds to the respective endpoint group. The respective security group can be another group, similar to the respective endpoint group, that is specific to the second type of virtualized environment. Moreover, each of the second set of endpoints can be assigned to the respective security group based on the respective attribute. For example, the endpoints added to the respective security group can have the same attribute in common as those endpoints added to the respective, counterpart endpoint group.

The method can further include defining, for the respective security group, a second respective policy model including the one or more rules associated with the first respective policy model. The second respective policy model can include those rules, policies, or firewalls defined in the first respective policy model for the respective attribute endpoint group. Thus, the respective security group can be assigned the same—or substantially similar—policies, rules, or firewalls as the respective attribute endpoint group associated with the respective security group.

Next, the method can include generating a respective network attribute endpoint group enumerating a respective network address of each endpoint in the respective security group. For example, a respective network address endpoint group can be generated to include the media access control (MAC) address of each endpoint in the respective security group. This allows devices in the network, such as switches, to classify traffic to/from those endpoints in the respective security group based on respective MAC addresses.

The respective network attribute endpoint group can also include the respective network address of any endpoints that have the respective attribute in common with the respective security group but do are not associated with the first or second virtualized environments. For example, the MAC addresses of endpoints which match the respective attribute and are associated with a third physical environment can also be included in the respective network attribute endpoint group.

The method can also include providing, for the respective network attribute endpoint group, a third respective policy model. The third respective policy model can include the one or more rules from the first and/or second respective policy model. In some examples, the third respective policy model can inherits the one or more rules from the first and/or second respective policy model. The rules in the third respective policy model can be used by network devices to enforce various policies for traffic associated with endpoints in the respective network attribute endpoint group, which are classified based on the network addresses of the endpoints.

Description

Software-defined networking (SDN) is an approach to computer networking which involves managing network services through abstraction of higher-level functionality. This can be done by decoupling the control plane from the data plane. Example SDN solutions include CISCO APPLICATION CENTRIC INFRASTRUCTURE (ACI) and VMWARE NSX.

CISCO ACI provides an application policy-based solution through scalable, distributed enforcement. ACI supports integration of physical and virtual environments under a declarative policy model for networks, servers, services and security. In the ACI framework, endpoints can be grouped into endpoint groups (EPGs). EPGs contain a collection of endpoints that share common policy requirements, such as security, QOS (quality of service), performance, services, and so forth. Endpoints can be virtual or physical devices or hosts, such as virtual machines (VM) and bare-metal physical servers, which are connected to the network. Endpoints can have many attributes, such as VM name, guest OS (operating system) name, security tag, etc.

Application policies can be applied between EPGs, instead of endpoints directly, in the form of contracts. In a data center network fabric, leaf switches can classify incoming traffic into different EPGs. The classification can be based on a network segment identifier, such as VLAN ID, VXLAN Network Identifier (VNID), NVGRE Virtual Subnet Identifier (VSID), etc. The classification can also be based on an endpoint's network address, such as a MAC (media access control) or IP (Internet Protocol) address. An address-based classification can include an enumeration of endpoints' network addresses, such as MAC or IP addresses.

ACI can support microsegmentation for APPLICATION VIRTUAL SWITCH (AVS) and physical hosts. AVS is a hypervisor-resident virtual network switch that works in the ACI architecture. With AVS microsegmentation, an attribute EPG can be introduced to group endpoints according to their attributes, such as VM name and guest OS name. The AVS can classify traffic based on the specified attributes, and tag packets of different attribute EPGs with different network segment identifiers, such as VLAN ID. Leaf switches can tie packets with their attribute EPGs based on their network segment identifiers and enforce policies.

In the case of physical hosts, network address-based EPGs can be used (e.g., MAC/IP based EPGs) for microsegmentation. For example, the network addresses (e.g., MAC/IP addresses) of physical hosts which belong to an EPG can be enumerated in a network address-based EPG, such as a MAC/IP based EPG. Based on the enumeration, a leaf switch can classify to which EPG the traffic from a physical host belongs and enforce policies.

VMWARE NSX microsegmentation can be supported by distributed firewall (DFW). Consider a case where three types of VMs—application, database and web VMs—are put into a single layer-2 network segment. Traffic protection needs to be provided within the network segment based on VM type. For example, HTTP traffic is allowed among web VMs only. HTTP is disallowed between a web VM and an application or database VM. In NSX, security groups (SG), sg-app, sg-db and sg-web, can be used to group application, database and web VMs, respectively. Then, DFW rules can be configured to block HTTP traffic between sg-web and sg-app or sg-db. Thus, NSX takes a software approach to support microsegmentation, where both classification and enforcement are done in the hypervisor. By contrast, CISCO ACI can take a combined approach where hardware and software can be used to support microsegmentation.

Other solutions for software-defined networks may implement classification and enforcement mechanisms that are based on hardware, software, or both. Moreover, modern data centers are generally not limited to a single SDN solution. Indeed, modern data centers can include different types of hosts and hypervisors, often with little to no interoperability.

Unfortunately, in heterogeneous networks or data centers, the different software-defined network solutions and mechanisms for classification and enforcement, as well as the variety of hosts and hypervisors, are generally not interoperable and do not integrate well. Thus, the approaches set forth herein can enable microsegmentation in heterogeneous environments, which can include multiple SDN solutions, multiple types of hosts or hypervisors, etc.

FIG. 1 illustrates an example heterogeneous network 100. The network 100 can include a network fabric 102. The fabric 102 can include spine routers 104 and leaf routers 106 (e.g., top-of-rack switches, etc.). Leaf routers 106 can reside at the edge of the fabric 102, and can thus represent the physical network edge. In some cases, the leaf routers 106 can connect the underlay (e.g., fabric 102) of the network 100 to an overlay. For example, the leaf routers 106 can be configured as tunnel endpoints which can encapsulate packets for specific virtualization and/or overlay environments or segments, such as virtual extensible local area network (VxLAN), network virtualization using generic routing encapsulation (NVGRE), etc.

The leaf routers 106 can be responsible for routing the tenant packets to and from the fabric 102, and applying network policies. The spine routers 104 can perform routing within the fabric 102. Thus, network connectivity in the fabric 102 can flow from the spine routers 104 through the leaf routers 106, and vice versa. The leaf routers 106 can provide hosts 108-120 access to the fabric 102. The leaf routers 106 can also provide any other servers, resources, endpoints, external networks, VMs, services, tenants, or workloads with access to the fabric 102.

Hosts 108-120 can include physical hosts 118 and virtual hosts 108-116, 120 (e.g., hypervisors, VMs, etc.). For example, physical host 118 can be a physical server hosting a web server 142, and virtual hosts 108-116, 120 can include hypervisors (H1-5 and H7), which can host VMs 126-140, 144. Virtual hosts 108-116, 120 can run virtual switching elements, which can depend on the type of hypervisor running on the virtual host. The types of hypervisors and virtual switching technologies in the heterogeneous network 100 can vary.

For example, virtual hosts 108-112 can run a first type of virtual switch ($VS_A$), such as VMWARE VSPHERE DISTRIBUTED SWITCH (VDS). Virtual hosts 108-112 can run the $VS_A$ on a particular hypervisor, such as VMWARE ESXI. Virtual hosts 114-116 can run a second type of virtual switch ($VS_B$), such as a CISCO APPLICATION VIRTUAL SWITCH. Further, virtual host 120 can run yet a different type of virtual switch ($VS_A$), such as MICROSOFT HYPER-V VIRTUAL SWITCH.

The virtual hosts 108-116, 120 can host one or more VMs. For example, virtual host 108 can host VM 126 (vm1-web) on H1. Virtual host 110 can host VMs 128 (vm2-web) and 130 (vm3-app) on H2. Virtual host 112 can host VM 132 (vm4-web) and VM 134 (vm5-db) on hypervisor H3. Virtual host 114 can host VM 136 (vm6-web) on hypervisor H4. Virtual host 116 can host VM 138 (vm7-app) and VM 140 (vm8-web) on hypervisor H5. Virtual host 120 can host VM 144 (vm9-web) on hypervisor H7.

VMs 126, 128, 132, 136, 140, 144 can be web VMs, as indicated by their VM names or labels (e.g., vm1-web, vm2-web, vm4-web, vm6-web, vm8-web, and vm9-web, respectively). Moreover, VMs 130 and 138 can be application VMs, as indicated by their VM names or labels (e.g., vm3-app and vm7-app, respectively). Finally, VM 134 can be a database VM, as indicated by the VM's name or label (vm5-db).

The different types of virtual switches ($VS_A$, $VS_B$, $VS_C$) and hypervisors (H1-H5) can be part of different SDNs ($SDN_A$, $SDN_B$), such as VMWARE NSX and CISCO ACI, and may perform different traffic classification and enforcement mechanisms. For example, virtual hosts 108-112, which host $VS_A$ virtual switches and hypervisors H1-3, can be part of a first SDN solution $SDN_A$, such as VMWARE NSX, and hosts 114-120, which host $VS_B$ virtual switches and hypervisors H4-5, can be part of a second SDN solution $SDN_B$, such as CISCO ACI.

The different types of SDNs (i.e., $SDN_A$, $SDN_B$) can use different approaches for microsegmentation. In particular, the different types of SDNs can vary on how they perform traffic classification and policy enforcement. For example, SDNs 146-148 ($SDN_A$) may use controllers 122, 124 to manage the classification of traffic and enforcement of policies. The hosts 108-112 can then classify traffic and enforce policies based on the classifications and enforcement policies defined by the controllers 122-124. Thus, like VMWARE NSX, $SDN_A$ can implement a software-driven approach for microsegmentation, where classification and enforcement are performed at the software level (e.g., hosts 108-112).

To illustrate, SDN 146 can implement security groups, configured at the controller 122, for managing traffic to and from the VMs 126-130 running on the hosts 108-110 managed by the controller 122. The security groups can be based on the type of VM or traffic (e.g., web, application, database, etc.), the type of hypervisor or guest operating system), a label or security tag associated with the traffic to and from VMs 126-130, etc. For example, a security group (SG) can be implemented for website traffic (e.g., http), and can include VMs 126, 128, which are web VMs and process web traffic. Another SG can be implemented for application traffic, and can include VM 130, which is an application VM that handles application traffic. The controller 122 can define respective policies for the web SG and application SGs. Thus, hosts 108, 110 can apply different policies to traffic associated with VMs 126-130 based on the respective classifications of the VMs 126-130 and corresponding policies defined by the respective SGs managed by the controller 122.

Similarly, SDN 148 can implement security groups, configured at the controller 124, for managing traffic to and from the VMs 132-134 running on the host 112 managed by the controller 124. The security groups can include, for example, a SG for website traffic, and can include VM 132, which is a web VM and processes web traffic. Another SG can be implemented for database traffic, and can include VM 134, which is a database VM that handles database traffic. The controller 124 can define respective policies for the web SG and database SGs. Thus, host 112 can apply different policies to traffic associated with VMs 132-134 based on the respective classifications of the VMs 132-134 and corresponding policies defined by the respective SGs managed by the controller 124.

On the other hand, SDN 150 ($SDN_B$) can be a different type of SDN, such as CISCO ACI. As opposed to $SDN_A$ (e.g., VMWARE NSX) which may use software to support microsegmentation, $SDN_B$ (SDN 150) can use a combination of hardware and software to support microsegmentation, similar to CISCO ACI.

For example, $SDN_B$ can use endpoint groups (EPGs) to implement microsegmentation. EPGs can include a collection of endpoints that share common policy requirements, such as security, QoS, services, etc. Endpoints can be virtual or physical devices, such as VMs 136-140 and bare-metal server 118, in the network 100. EPGs can have various attributes such as VM name, guest OS name, security tag, etc. Application policies can be applied between EPGs, which allows enforcement of policies for groups of endpoints as opposed to individual endpoints. In the fabric 102, leaf switches 106 can classify incoming traffic into different EPGs. This classification can be based on a network segment identifier (e.g., VLAN ID, VxLAN Network Identifier, NVGRE Virtual Subnet Identifier, etc.) or a network address (e.g., media access control address, IP address, etc.).

$SDN_B$ can support microsegmentation for specific types of hosts or elements, such as $VS_B$ virtual switching elements (e.g., H4/$VS_B$ and H5/$VS_B$ associated with hosts 114-116) and physical hosts (e.g., host 118). For microsegmentation in $SDN_B$, an attribute EPG can be used to group endpoints according to their attributes (e.g., VM name, guest OS name, security tag, etc.). The virtual switching elements $VS_B$ can classify traffic based on the specified attributes, and tag packets of different EPGs with different network segment identifiers. Leaf switches 106 can then map packets to specific attribute EPGs based on the specific network segment identifiers. Leaf switches 106 can also enforce policies for the traffic based on the attribute EPG associated with the traffic.

In the case of physical host 118, which does not run virtual switching element $VS_B$, classification and enforcement can be based on an endpoint's network address (e.g., MAC address, IP address, etc.). For example, a network address EPG (e.g., MAC/IP EPG) can be generated, enumerating the network address of those physical hosts that should be included in a particular EPG based on an attribute of the physical host. For example, a network address EPG, MAC-EPG-WEB, can be generated to include the MAC address of any physical host(s) matching the web attribute (i.e., physical hosts named web, physical hosts running a website, physical hosts handling web traffic, etc.). Leaf switches 106 can analyze traffic associated with the physical host having a web attribute (e.g., web host 118), classify the traffic as belonging to the web attribute EPG and enforce any policies associated with the web attribute EPG.

For example, a leaf switch 106 can receive traffic associated with host 118, which is labeled web and runs a web server 142, and determine that host 118 is listed in a MAC-EPG-WEB, which contains physical hosts having a web attribute. The leaf switch can then enforce policies for that traffic based on the policies defined for endpoints in the MAC-EPG-WEB.

On the other hand, if a leaf switch 106 receives traffic associated with a virtual switching element $VS_B$, the leaf switch 106 can determine which attribute EPG the virtual switching element $VS_B$ is assigned to based on the network segment identifier included in the traffic by the virtual switching element $VS_B$. The leaf switch 106 can then classify the traffic based on the particular attribute EPG and enforce policies defined for that particular attribute EPG. For example, leaf switch 106 can receive a packet from VM 136 and H4/$VS_B$. The leaf switch 106 can then classify the packet based on a network segment identifier in the packet. Here, the leaf switch 106 can extract the network segment identifier from the packet and determine which attribute EPG (e.g., web-attribute-EPG) is associated with that particular network segment identifier. Thus, based on the network segment identifier in the packet, the leaf switch 106 can determine it is associated with an endpoint belonging to the web attribute EPG (i.e., web-attribute-EPG). The leaf switch 106 can then apply policies to the packet defined for traffic associated with the web attribute EPG.

The different SDN solutions (e.g., $SDN_A$ and $SDN_B$) may be incompatible with each other. This can be at least partly due to the SDN solutions utilizing different classification and enforcement approaches. As a result, microsegmentation may not be fully supported for east-west traffic in network 100 flowing between different SDNs and/or SDN solutions. For example, policies defined for an EPG in $SDN_B$, such as web-attribute-EPG, may not be recognized or enforced by devices in $SDN_A$. Similarly, policies defined for SGs in $SDN_A$, such as SG-web, may not be recognized or enforced by devices in $SDN_B$.

Indeed, in some cases, microsegmentation may not be fully supported for east-west traffic within a portion of the network 100 implementing a single SDN solution. For example, microsegmentation may not be fully supported for traffic flowing between SDN 146 and SDN 148, despite both SDN 146 and SDN 148 implementing the same SDN solution, $SDN_A$. In particular, because SDN 146 and SDN 148 are implemented or managed by different controllers (controller 122 and 124), microsegmentation may not be fully supported for traffic between endpoints at both SDNs 146, 148. For example, the SGs and respective policies defined or managed by controller 122 may not be visible to endpoints and devices in SDN 148, and the SGs and respective policies defined or managed by controller 124 may not be visible to endpoints and devices in SDN 146. Accordingly, network 100 may not be able to enforce policies for traffic between endpoints in both SDNs 146, 148.

To illustrate, consider a policy defined for a security group at controller 124, where the security group corresponds to web endpoints (e.g., SG-web). In this example, the policy may require web traffic (e.g., http traffic) to be allowed only between web endpoints, and otherwise blocked or dropped if flowing to or from an endpoint that is not in the web security group. Also consider that VM4-web on host 112 sends a packet to VM2-web and VM3-app on host 110. VM4-web is assigned to the web security group, SG-web, defined by controller 124. Accordingly, traffic to and from VM4-web should be processed according to the policies defined for the web security group defined by controller 124. Thus, in this example, based on the policy defined for the web security group in controller 124, the packet from VM4-web to VM2-web should be allowed, while the packet from VM4-web to VM3-app should be blocked or dropped. However, because the security groups in controller 124 are not visible by controller 122 and SDN 146, and the security groups in controller 122 are not visible by controller 124 and SDN 148, the traffic to VM2-web and VM3-app on host 110 will be treated the same. In other words, the packets to VM2-web and VM3-app will both be allowed or blocked, for example.

Furthermore, microsegmentation may not be fully supported for traffic between $SDN_A$ and a physical host (e.g., host 118 and web server 142), or between $SDN_A$ and a different type of hypervisor or virtual switching element that is not associated with $SDN_A$, such as H7 and virtual switching element $VS_C$ on host 120. In fact, in some cases, microsegmentation for $SDN_A$ may only be supported for traffic between an endpoint managed by a particular controller associated with $SDN_A$ and another endpoint managed by the same particular controller associated with $SDN_A$.

In order to support microsegmentation across different SDNs, endpoints, hypervisors, virtual switching elements, virtualized environments, etc., in the heterogeneous network 100, the approaches for classification and enforcement can be adapted as follows.

First, for each attribute EPG in $SDN_B$, a corresponding security group can be created at each controller 122, 124 on SDNs 146, 148, based on the attribute(s) specified in the attribute EPG. For example, an attribute EPG at $SDN_B$, attr-epg-web, may include web VMs. The web VMs can refer to, for example, VMs that have names which include the string "web". Correspondingly, a security group, sg-web1, can be created at controller 122, including all VMs with names containing the string "web" running on hosts 108, 110 (e.g., vm1-web 126 and vm2-web 128). Similarly, a security group, sg-web2, can be created at controller 124, including all VMs with names containing the string "web" running on host 112 (e.g., vm4-web 132).

As another example, another attribute EPG at $SDN_B$, attr-epg-app, may include application VMs. The application VMs can refer to, for example, VMs that have names which include the string "app". Correspondingly, a security group, sg-app1, can be created at controller 122, including all VMs with names containing the string "app" running on hosts 108, 110 (e.g., vm3-app 130). Similarly, a security group, sg-app2, can be created at controller 124, including all VMs with names containing the string "web" running on host 112.

For each security group created at the controllers 122, 124, a set of policies (e.g., distributed firewall rules, enforcement policies, etc.) can then be created. The set of policies for each security group can match or mirror the policies (e.g., contracts, enforcement policies, etc.) associated with a corresponding EPG in $SDN_B$. For example, the $SDN_B$ may have a set of policies defined for a particular EPG, such as attr-epg-web, which can be an EPG on $SDN_B$ containing endpoints having the string "web" in their name. Thus, for the web security groups in controllers 122, 124 (i.e., sg-web1 containing vm1-web 126 and vm2-web 128; and sg-web2 containing vm4-web 132), a set of policies can be defined which match or mirror the policies created for the corresponding web EPG, attr-epg-web, on $SDN_B$.

For example, consider a policy defined on $SDN_B$ for the web EPG, attr-epg-web, which provides that http traffic between endpoints in attr-epg-web and endpoints in an application EPG on $SDN_B$, attr-epg-app, should be blocked. Matching or mirroring policies can be created for $SDN_A$ on controllers 122, 124, indicating that http traffic between sg-web1 and sg-app1, and sg-web2 and sg-app2, should be blocked. Since the security groups sg-web1 and sg-web2 on controllers 122, 124 are the $SDN_A$ counterparts of the web EPG on $SDN_B$, attr-epg-web, then the policies defined for attr-epg-web on the $SDN_B$ should match the policies defined on controllers 122, 124 for sg-web1 and sg-web2.

Next, a respective network address EPG (e.g., MAC EPG, IP EPG, etc.) can be created corresponding to each security group on $SDN_A$ and/or each attribute EPG in $SDN_B$. The respective network address EPG can include a network address, such as a MAC address, of the endpoints (e.g., VMs) that are members of the corresponding security group, which corresponds to an attribute EPG on $SDN_B$. For example, a MAC EPG, mac-epg-web, can be created corresponding to attr-epg-web, which includes the VMs included in the security groups sg-web1 on controller 122 and sg-web2 on controller 124. Thus, the mac-epg-web can include vm1-web, vm2-web, and vm4-web, from sg-web1 and sg-web2.

Each respective network address EPG can inherit the policies defined for the particular attribute EPG on $SDN_B$ corresponding to the respective network address EPG. For example, consider a policy in $SDN_B$ which provides that http traffic between EPGs attr-epg-app and attr-epg-web should be disallowed or blocked. Then, by inheritance, any http traffic between mac-epg-app and mac-epg-web should also be disallowed or blocked.

By following these steps, microsegmentation can be performed across the heterogeneous network 100. Traffic can be classified and policies enforced across different SDNs, hypervisors, virtual switching elements, etc. For example, by categorizing the VMs 126-134 in the $SDN_A$ into security groups, the leaf switches 106 can use the network address EPGs (e.g., MAC EPGs) to differentiate traffic from VMs running on $VS_A$ in the $SDN_A$, and then apply the same policies as corresponding attribute EPGs from the $SDN_B$ based on inheritance.

To illustrate, consider policies defined in $SDN_B$ for a web EPG and a database EPG, attr-epg-web and attr-epg-db, which provide that http traffic should only be allowed between VMs that are members of the web EPG, attr-epg-web. The microsegmentation of network 100 as discussed above would result in http traffic from vm1-web 126 to vm4-web 132 being associated with a MAC EPG, mac-epg-web, on leaf 1. As a result, this http traffic would be allowed in hardware based on the policy inherited from the counterpart attribute EPG on $SDN_B$, attr-epg-web. On the other hand, http traffic from vm1-web 126 to vm5-db 134 would be associated with web and database MAC EPGs, mac-epg-web and mac-epg-db, and would be consequently blocked in hardware based on the relevant policies inherited from the counterpart attribute EPGs on $SDN_B$, attr-epg-web and attr-epg-db.

The EPGs, SGs, and policies can be configured by manual configuration, out-of-band automation, and in-band automation.

Manual Configuration

An administrator or user can configure the security groups and security group policies in $SDN_A$ along with the attribute EPGs in $SDN_B$. The user can then retrieve the network addresses (e.g., MAC addresses) of the VMs in each of the security groups and configure the MAC EPGs by enumerating the retrieved VM network addresses. The user can then update the network address EPG when there are VM changes. For example, a new VM powers up and falls into one of the security groups. The user can then update the network address security group to add the network address of the new VM.

Out-of-Band Automation

Once attribute EPGs and policies are configured by a user in the $SDN_B$, a controller 152 (e.g., Application Policy Infrastructure Controller) can create the security groups and policies in $SDN_A$ through APIs associated with controllers 122-124. For example, if $SDN_A$ is based on VMWARE NSX and controllers 122-124 are NSX managers, then the controller 152 can create the security groups and policies through NSX manager REST APIs.

Once the controller 152 creates the security groups and policies, it can then retrieve member VMs per security group through the APIs (e.g., NSX manager REST APIs) and create the network address EPGs (e.g., MAC EPGs) automatically based on the retrieved network addresses. The controller 152 can dynamically update the network address EPGs by monitoring security group membership.

In-Band Automation

In this example, the security groups and policies for the security groups can be generated through manual configuration or out-of-band automation. However, when creating the network address EPGs, this mechanism can obtain the security group VM membership through a first-hop protocol such as VDP (Virtual Station Interface Discovery and Configuration Protocol). In this example, a new VDP VM Security Group TLV can be created to convey the security groups a VM is associated with. The TLV value can include a list of security groups. When a VM powers up and joins security groups, it can notify its connected leaf switch 106 via VDP. Subsequently, network address EPGs can be updated based on the VDP information.

FIG. 2 illustrates an example list 200 of security groups (SGs) and endpoint groups (EPGs) configured for microsegmentation in network 100. The list 200 can include attribute EPGs 202-204, security groups 206-216, and MAC EPGs 218-222.

The attribute EPGs 202-204 (i.e., attr-epg-app and attr-epg-web) can include the VMs 136-140 and 144 residing on hosts 114-116 and 120, associated with $SDN_B$. In particular, attr-epg-app 202 can include vm7-app 138 from host 116, and attr-epg-web 204 can include vm6-web 136, vm8-web 140 from host 116 and vm9-web 144 from host 120.

The security groups 206-216 (i.e., sg-app1, sg-db1, sg-web1, sg-app2, sg-db2, sg-web2) can include the VMs 126-134 residing on hosts 108-112, associated with $SDN_A$.

Sg-app1 206 can include vm3-app 130 from host 110. Sg-db1 208 and sg-app2 212 can be null 224. Sg-web1 210 can include vm1-web 126 on host 108 and vm2-web 128 on host 110. Sg-db2 214 can include vm5-db 134 on host 112, and sg-web2 216 can include vm4-web 132 on host 112.

The MAC EPGs 218-222 (i.e., mac-epg-web, mac-epg-app, mac-epg-db) can include VMs 126, 128, 130, 132, 134 and web server 142. For example, mac-epg-app 218 can include vm3-app 130 on host 110. Mac-epg-db 220 can include vm5-db 134 on host 112. Finally, mac-epg-web 222 can include vm1-web 126 on host 108, vm2-web 128 on host 110, vm4-web 132 on host 112, as well as web server 142 on the physical host 118.

Figure 3:
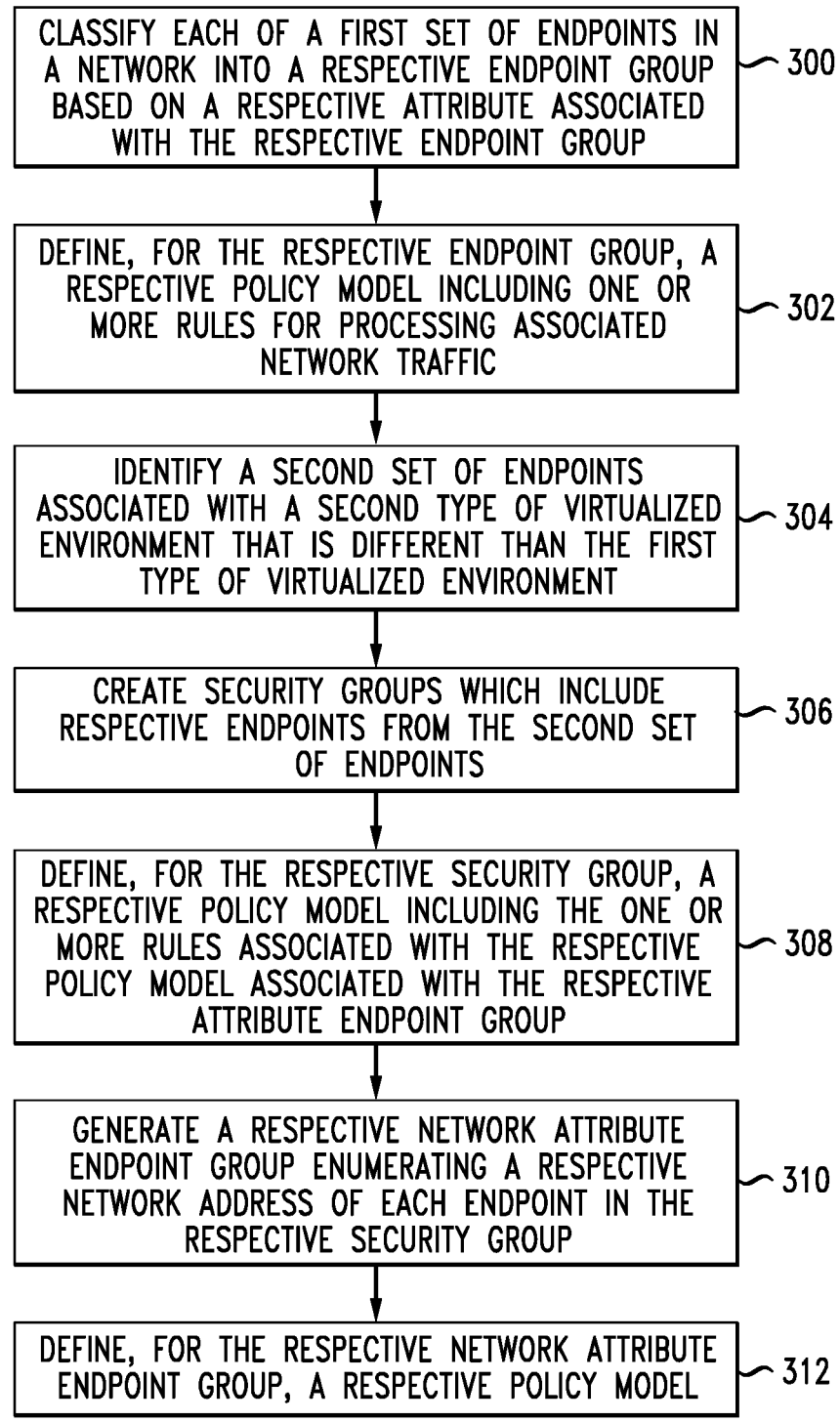
FIG. 3 illustrates an example method for microsegmentation in a heterogeneous datacenter.

Having disclosed some basic system components and concepts, the disclosure now turns to the exemplary method embodiment shown in FIG. 3. For the sake of clarity, the method is described in terms of a controller 152, as shown in FIG. 1, configured to practice the method. The steps outlined herein are exemplary and can be implemented in any combination thereof, including combinations that exclude, add, or modify certain steps.

At step 300, the controller 152 can classify each of a first set of endpoints (e.g., VMs 136-140) in a network 100 into a respective endpoint group (e.g., attr-epg-web, attr-epg-app, attr-epg-db), based on a respective attribute (e.g., name, label, guest OS name, security tag, etc.) associated with the respective endpoint group. The first set of endpoints can be associated with a first type of virtualized environment (e.g., $SDN_B$, $VS_B$, etc.). The virtualized environment can include an SDN environment, a type of hypervisor, a type of virtual host, a type of virtual switching device, etc.

At step 302, the controller 152 can define, for the respective endpoint group (e.g., attr-epg-web, attr-epg-app, attr-epg-db), a respective policy model including one or more rules for processing associated network traffic. For example, the respective policy model can define which type of traffic should be allowed, blocked, dropped, prioritized, filtered, etc. To illustrate, the policy model can define rules providing which types of endpoints, VMs, or EPGs can communicate with those endpoints in the respective endpoint group.

At step 304, the controller 152 can identify a second set of endpoints (e.g., VMs 126-134) associated with a second type of virtualized environment (e.g., $SDN_A$, $VS_A$, etc.) that is different than the first type of virtualized environment. At step 306, the controller 152 can create security groups (e.g., sg-web1, sg-app1, sg-db1, sg-web2, sg-app2, sg-db2) which include each of the second set of endpoints. Each respective security group from the security groups can correspond to a respective endpoint group from step 300. Moreover, each of the second set of endpoints can be included in the respective security group based on the respective attribute (e.g., name, label, guest OS name, security tag, etc.).

At step 308, the controller 152 can define, for each respective security group, a respective policy model including the one or more rules associated with the respective policy model associated with the respective attribute EPG. For example, the policies or rules created at step 302 for an attribute EPG can be defined for the counterpart security group from step 308.

To illustrate, assume a web EPG, attr-epg-web, is created at step 300 to include the VMs 136 and 140 associated with the first virtualized environment which include the string "web" in their name. Assume that a policy for the web EPG is defined at step 302 which provides that http traffic can only be sent to, or received from, other web VMs (e.g., VMs in attr-epg-web). Also assume that a web security group is created at step 306 as a counterpart of attr-epg-web, for including VMs 126, 128 associated with the second virtualized environment which similarly includes the string "web" in their name. Then, at step 308, policies or rules defined for the web security group can match or mirror the policies or rules defined for attr-epg-web at step 302. Thus, like the policy or rule from step 302 in this example, which provides that http traffic can only be sent to, or received from, other web VMs, the policy or rule defined for the web security group can also provide that http traffic can only be sent to, or received from, other web VMs (e.g., VMs in a web security group).

At step 310, the controller 152 can generate a respective network attribute endpoint group (e.g., mac-epg-web, mac-epg-app, mac-epg-db) enumerating a respective network address of each endpoint in the respective security group (e.g., sg-web1, sg-app1, sg-db1, sg-web2, sg-app2, sg-db2). The respective network attribute endpoint group can also enumerate the network addresses of other endpoints in the network 100, which match the particular attribute associated with the respective attribute EPG and which are not part of the respective attribute EPG or the respective security group (e.g., web 142).

For example, mac-epg-web can be created to include those VMs in the web security groups, sg-web1 and sg-web2 (e.g., vm1-web 126, vm2-web 128, vm4-web 132), as well as any other endpoints that match the attribute "web" and which are not included in the respective attribute EPG or security group (e.g., web 142). This can allow the leaf routers 106 to identify or classify endpoints in the network 100 that are not part of the $SDN_B$ or bare metal hosts, and apply specific policies to those endpoints based on their membership in the MAC EPG, as further described below.

At step 312, the controller 152 can define, for the respective network attribute endpoint group, a respective policy model. The respective policy model can include one or more rules or policies inherited from the respective policy model of the respective attribute EPG. For example, the web network address EPG, mac-epg-web, can inherit the rules or policies defined for the web attribute EPG, attr-epg-web. Accordingly, leaf switches 106 in the network 100 will be able to enforce those policies defined for the respective attribute EPG on traffic associated with the counterpart network address EPG (e.g., MAC EPG).

The steps 300-312 are described herein as being performed by controller 152. However, this is simply one non-limiting example provided for explanation purposes and the sake of clarity. Indeed, one of ordinary skill in the art will recognize that one or more of steps 300-312 can be performed by one or more other devices, such as a leaf 106 in the network 100, a different server or controller (e.g., ACI controller or Application Policy Infrastructure Controller) in the network 100, a host (e.g., hosts 108-120) in the network 100, a device in the fabric 102, or any other physical and/or virtual device or endpoint. Moreover, one or more of steps 300-312 can be performed using manual configuration, out-of-band configuration, and/or in-band configuration, as previously described.

Figure 4:
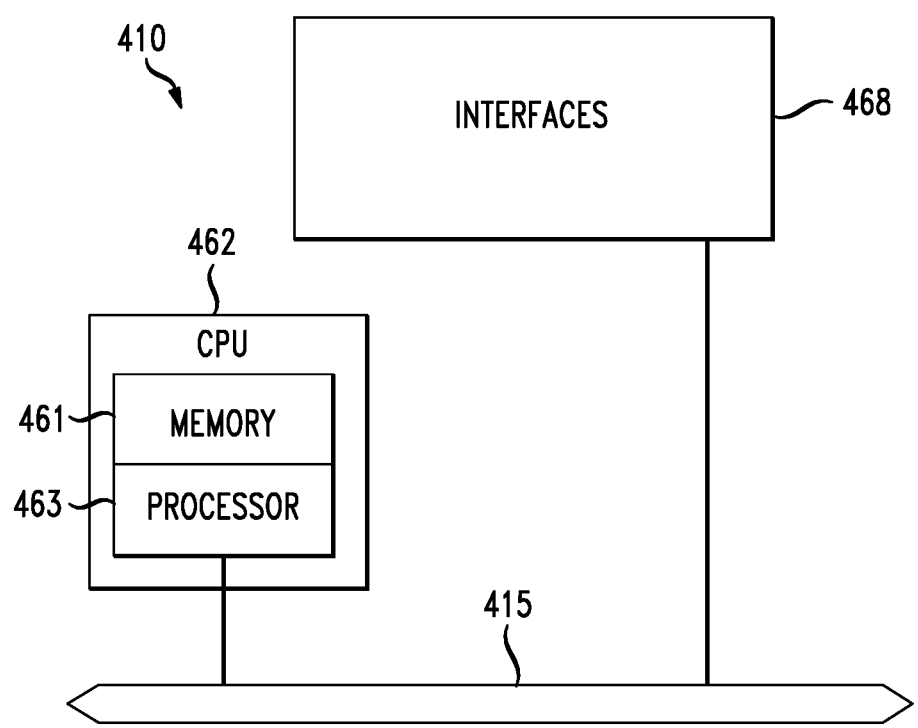
FIG. 4 illustrates an example network device.

FIG. 4 illustrates an example network device 410 suitable for high availability and failover. Network device 410 includes a master central processing unit (CPU) 462, interfaces 468, and a bus 415 (e.g., a PCI bus). When acting under the control of appropriate software or firmware, the CPU 462 is responsible for executing packet management, error detection, and/or routing functions. The CPU 462 preferably accomplishes all these functions under the control of software including an operating system and any appropriate applications software. CPU 462 may include one or more processors 463 such as a processor from the Motorola family of microprocessors or the MIPS family of microprocessors. In an alternative embodiment, processor 463 is specially designed hardware for controlling the operations of router 410. In a specific embodiment, a memory 461 (such as non-volatile RAM and/or ROM) also forms part of CPU 462. However, there are many different ways in which memory could be coupled to the system.

The interfaces 468 are typically provided as interface cards (sometimes referred to as "line cards"). Generally, they control the sending and receiving of data packets over the network and sometimes support other peripherals used with the router 410. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 462 to efficiently perform routing computations, network diagnostics, security functions, etc.

Although the system shown in FIG. 4 is one specific network device of the present invention, it is by no means the only network device architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 461) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

Figure 5A:
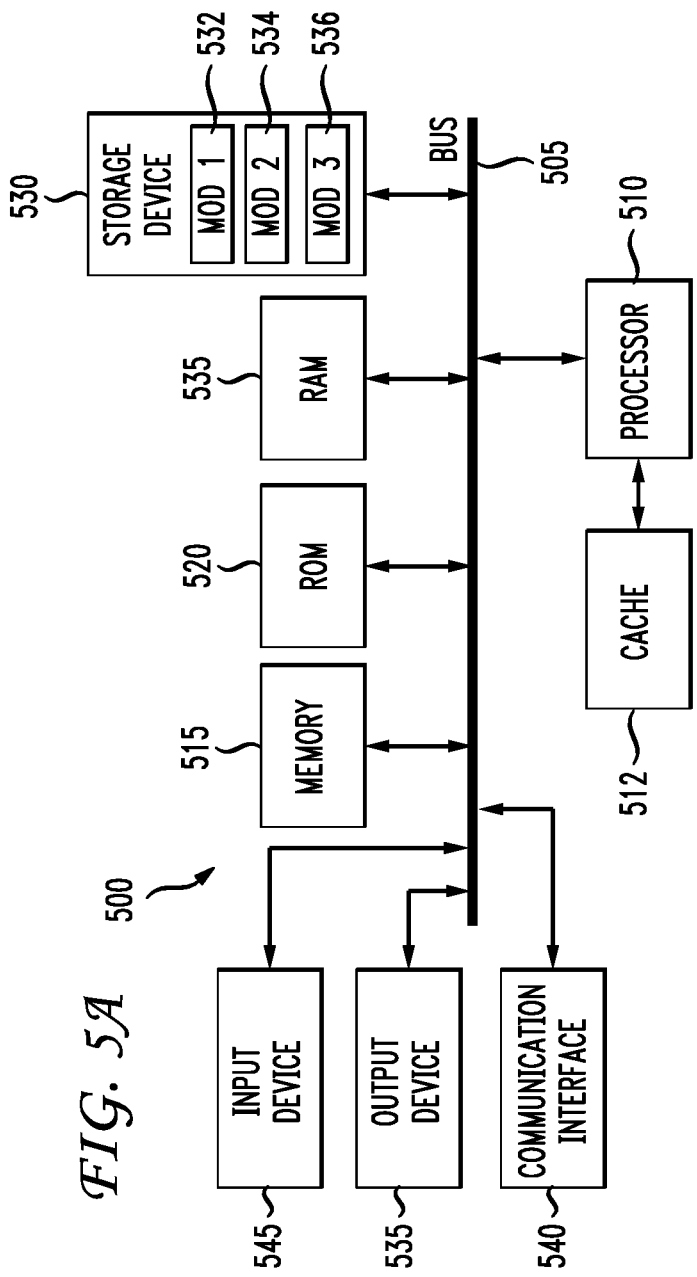
FIGS. 5A and 5B illustrate example system embodiments.
Figure 5B:
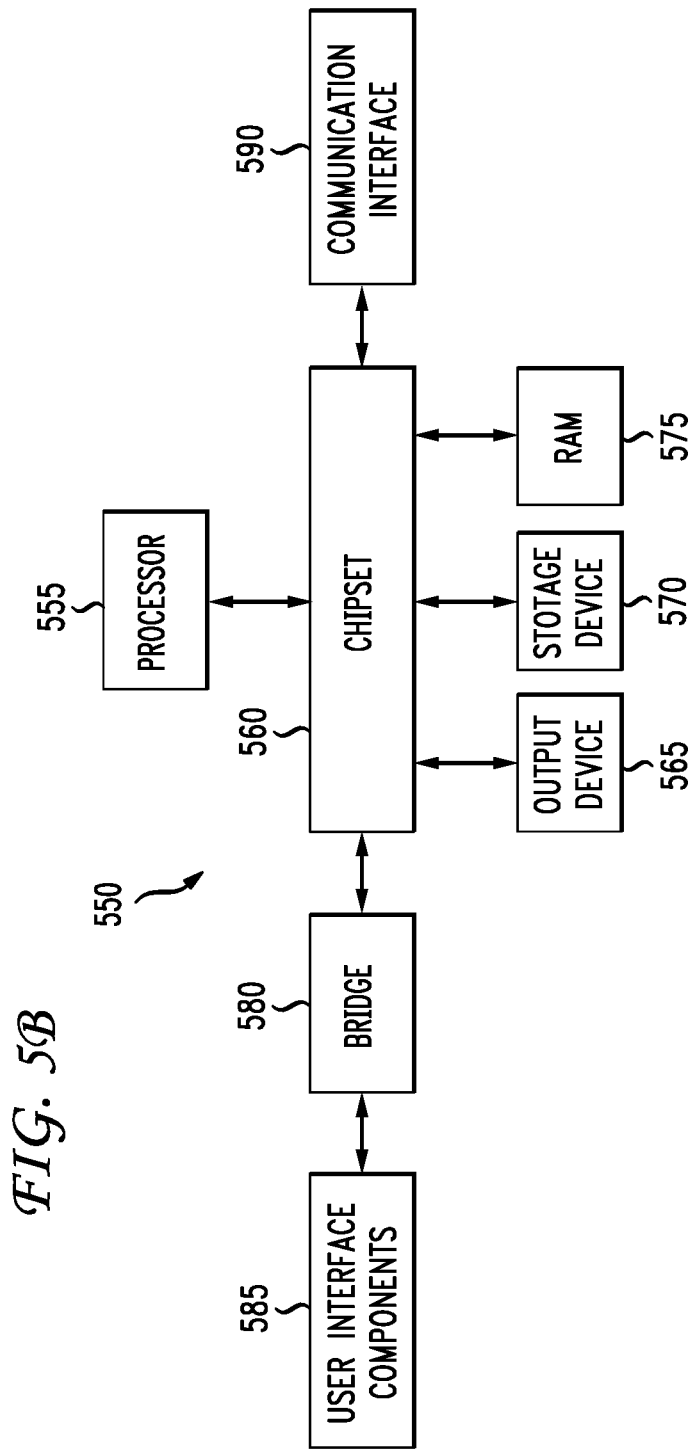

FIG. 5A and FIG. 5B illustrate example system embodiments. The more appropriate embodiment will be apparent to those of ordinary skill in the art when practicing the present technology. Persons of ordinary skill in the art will also readily appreciate that other system embodiments are possible.

FIG. 5A illustrates a conventional system bus computing system architecture 500 wherein the components of the system are in electrical communication with each other using a bus 505. Exemplary system 500 includes a processing unit (CPU or processor) 510 and a system bus 505 that couples various system components including the system memory 515, such as read only memory (ROM) 520 and random access memory (RAM) 525, to the processor 510. The system 500 can include a cache of high-speed memory connected directly with, in close proximity to, or integrated as part of the processor 510. The system 500 can copy data from the memory 515 and/or the storage device 530 to the cache 512 for quick access by the processor 510. In this way, the cache can provide a performance boost that avoids processor 510 delays while waiting for data. These and other modules can control or be configured to control the processor 510 to perform various actions. Other system memory 515 may be available for use as well. The memory 515 can include multiple different types of memory with different performance characteristics. The processor 510 can include any general purpose processor and a hardware module or software module, such as module 1 532, module 2 534, and module 3 536 stored in storage device 530, configured to control the processor 510 as well as a special-purpose processor where software instructions are incorporated into the actual processor design. The processor 510 may essentially be a completely self-contained computing system, containing multiple cores or processors, a bus, memory controller, cache, etc. A multi-core processor may be symmetric or asymmetric.

To enable user interaction with the computing device 500, an input device 545 can represent any number of input mechanisms, such as a microphone for speech, a touch-sensitive screen for gesture or graphical input, keyboard, mouse, motion input, speech and so forth. An output device 535 can also be one or more of a number of output mechanisms known to those of skill in the art. In some instances, multimodal systems can enable a user to provide multiple types of input to communicate with the computing device 500. The communications interface 540 can generally govern and manage the user input and system output. There is no restriction on operating on any particular hardware arrangement and therefore the basic features here may easily be substituted for improved hardware or firmware arrangements as they are developed.

Storage device 530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 525, read only memory (ROM) 520, and hybrids thereof.

The storage device 530 can include software modules 532, 534, 536 for controlling the processor 510. Other hardware or software modules are contemplated. The storage device 530 can be connected to the system bus 505. In one aspect, a hardware module that performs a particular function can include the software component stored in a computer-readable medium in connection with the necessary hardware components, such as the processor 510, bus 505, display 535, and so forth, to carry out the function.

FIG. 5B illustrates an example computer system 550 having a chipset architecture that can be used in executing the described method and generating and displaying a graphical user interface (GUI). Computer system 550 is an example of computer hardware, software, and firmware that can be used to implement the disclosed technology. System 550 can include a processor 555, representative of any number of physically and/or logically distinct resources capable of executing software, firmware, and hardware configured to perform identified computations. Processor 555 can communicate with a chipset 560 that can control input to and output from processor 555. In this example, chipset 560 outputs information to output device 565, such as a display, and can read and write information to storage device 570, which can include magnetic media, and solid state media, for example. Chipset 560 can also read data from and write data to RAM 575. A bridge 550 for interfacing with a variety of user interface components 555 can be provided for interfacing with chipset 560. Such user interface components 555 can include a keyboard, a microphone, touch detection and processing circuitry, a pointing device, such as a mouse, and so on. In general, inputs to system 550 can come from any of a variety of sources, machine generated and/or human generated.

Chipset 560 can also interface with one or more communication interfaces 590 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 555 analyzing data stored in storage 570 or 575. Further, the machine can receive inputs from a user via user interface components 555 and execute appropriate functions, such as browsing functions by interpreting these inputs using processor 555.

It can be appreciated that example systems 500 and 550 can have more than one processor 510 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Moreover, claim language reciting "at least one of" a set indicates that one member of the set or multiple members of the set satisfy the claim. For example, claim language reciting "at least one of A and B" can include A only, B only, or A and B.

What is claimed is:

1. A method comprising:
   classifying each of a first plurality of endpoints in a network into a first endpoint group, based on each of the first plurality of endpoints having an attribute of the first endpoint group, wherein the first plurality of endpoints have a first software-defined networking (SDN) solution;
   defining, for the first endpoint group, a first policy model comprising one or more rules for processing associated network traffic;
   identifying a second plurality of endpoints having (a) a second SDN solution that is different than, and incompatible with, the first SDN solution and (b) the attribute of the first endpoint group;
   classifying each of the second plurality of endpoints into a second end point group;
   defining, for the second endpoint group, a second policy model comprising the one or more rules associated with the first policy model;
   generating a third endpoint group enumerating a network address of each endpoint in the second end point group; and
   defining, for the third endpoint group, a third policy model, wherein the third policy model inherits the one or more rules from the first policy model;
   wherein the one or more rules in the first, second and third policy models provide for uniform enforcement of the one or more rules across the first, second and third endpoint groups.

2. The method of claim 1, wherein the network address of each endpoint in the second end point group comprises at least one of a media access control address and an internet protocol address.

3. The method of claim 1, wherein the first SDN solution comprises at least one of a first type of hypervisor, a first type of virtual machine, and a first type of virtual switching element; and wherein the second SDN solution comprises at least one of a second type of hypervisor, a second type of virtual machine, and a second type of virtual switching element.

4. The method of claim 1, wherein the attribute associated with the first endpoint group comprises at least one of a virtual machine name, a guest operating system of an associated endpoint, and a security tag of the associated endpoint.

5. The method of claim 1, wherein the second endpoint group is not visible to the first plurality of endpoints, and wherein the first endpoint group and the first policy model are not visible to the second plurality of endpoints.

6. The method of claim 1, further comprising:
receiving, via a network device on the network, a packet from a node in the network;
associating the packet with the first endpoint group based on a network segment identifier associated with the packet.

7. The method of claim 6, wherein the network segment identifier comprises at least one of a virtual local area network identifier, a virtual extensible local area network identifier, and a network virtualization using generic routing encapsulation (NVGRE) virtual subnet identifier.

8. A system comprising:
one or more processors; and
one or more computer-readable storage devices having stored therein instructions which, when executed by the one or more processors, cause the one or more processors to perform operations comprising:
classifying each of a first plurality of endpoints in a network into a first endpoint group, based on each of the first plurality of endpoints having an attribute of the first endpoint group, wherein the first plurality of endpoints have a first software-defined networking (SDN) solution;
defining, for the first endpoint group, a first policy model comprising one or more rules for processing associated network traffic;
identifying a second plurality of endpoints having (a) a second SDN solution that is different than, and incompatible with, the first SDN solution and (b) the attribute of the first endpoint group;
classifying each of the second plurality of endpoints into a second end point group;
defining, for the second endpoint group, a second policy model comprising the one or more rules associated with the first policy model;
generating a third endpoint group enumerating a network address of each endpoint in the second end point group; and
defining, for the third endpoint group, a third policy model, wherein the third policy model inherits the one or more rules from the first policy model;
wherein the one or more rules in the first, second and third policy models provide for uniform enforcement of the one or more rules across the first, second and third endpoint groups.

9. The system of claim 8, wherein the network address of each endpoint in the second end point group comprises at least one of a media access control address and an internet protocol address.

10. The system of claim 8, wherein the first SDN solution comprises at least one of a first type of hypervisor, a first type of virtual machine, and a first type of virtual switching element; and wherein the second SDN solution comprises at least one of a second type of hypervisor, a second type of virtual machine, and a second type of virtual switching element.

11. The system of claim 8, wherein the attribute associated with the first endpoint group comprises at least one of a virtual machine name, a guest operating system of an associated endpoint, and a security tag of the associated endpoint.

12. The system of claim 8, wherein the second endpoint group is not visible to the first plurality of endpoints, and wherein the first endpoint group and the first policy model are not visible to the second plurality of endpoints.

13. The system of claim 8, the operations further comprising:
receiving, via a network device on the network, a packet from a node in the network;
associating the packet with the first endpoint group based on a network segment identifier associated with the packet.

14. The system of claim 13, wherein the network segment identifier comprises at least one of a virtual local area network identifier, a virtual extensible local area network identifier, and a network virtualization using generic routing encapsulation (NVGRE) virtual subnet identifier.

15. A non-transitory computer-readable storage medium having stored therein instructions which, when executed by a processor, cause the processor to perform operations comprising:
classifying each of a first plurality of endpoints in a network into a first endpoint group, based on each of the first plurality of endpoints having an attribute of the first endpoint group, wherein the first plurality of endpoints have a first software-defined networking (SDN) solution;
defining, for the first endpoint group, a first policy model comprising one or more rules for processing associated network traffic;
identifying a second plurality of endpoints having (a) a second SDN solution that is different than, and incompatible with, the first SDN solution and (b) the attribute of the first endpoint group;
classifying each of the second plurality of endpoints into a second end point group;
defining, for the second endpoint group, a second policy model comprising the one or more rules associated with the first policy model;
generating a third endpoint group enumerating a network address of each endpoint in the second end point group; and
defining, for the third endpoint group, a third policy model, wherein the third policy model inherits the one or more rules from the first policy model;
wherein the one or more rules in the first, second and third policy models provide for uniform enforcement of the one or more rules across the first, second and third endpoint groups.

16. The media of claim 15, wherein the network address of each endpoint in the second end point group comprises at least one of a media access control address and an internet protocol address.

17. The media of claim 15, wherein the first SDN solution comprises at least one of a first type of hypervisor, a first type of virtual machine, and a first type of virtual switching element; and wherein the second SDN solution comprises at least one of a second type of hypervisor, a second type of virtual machine, and a second type of virtual switching element.

18. The media of claim 15, wherein the attribute associated with the first endpoint group comprises at least one of a virtual machine name, a guest operating system of an associated endpoint, and a security tag of the associated endpoint.

19. The media of claim 15, wherein the second endpoint group is not visible to the first plurality of endpoints, and wherein the first endpoint group and the first policy model are not visible to the second plurality of endpoints.

20. The media of claim 15, further comprising:
receiving, via a network device on the network, a packet from a node in the network;
associating the packet with the first endpoint group based on a network segment identifier associated with the packet.

\* \* \* \* \*